(12) United States Patent
Kim

(10) Patent No.: US 7,687,559 B2
(45) Date of Patent: Mar. 30, 2010

(54) ROLLER RUBBER FORMING COMPOSITION, RUBBER ROLLER INCLUDING THE SAME, AND IMAGING APPARATUS INCLUDING THE RUBBER ROLLER

(75) Inventor: Tae-hyun Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 182 days.

(21) Appl. No.: 11/902,847

(22) Filed: Sep. 26, 2007

(65) Prior Publication Data

US 2008/0176992 A1    Jul. 24, 2008

(30) Foreign Application Priority Data

Jan. 24, 2007  (KR)  ................ 10-2007-0007650

(51) Int. Cl.
*C08K 5/00*  (2006.01)
*C08L 55/00*  (2006.01)

(52) U.S. Cl. ....................... 524/284; 524/554

(58) Field of Classification Search ......... 524/284
See application file for complete search history.

(56) References Cited

U.S. PATENT DOCUMENTS 6,458,883 B1 * 10/2002 Takashima et al. .......... 524/495
2004/0161620 A1 *  8/2004 Tanaka et al. ............ 428/473.5
2005/0220502 A1 * 10/2005 Kim .......................... 399/286

FOREIGN PATENT DOCUMENTS

JP   2000-203754   7/2000
JP   2003-149934   5/2003

* cited by examiner

*Primary Examiner*—Lin-Siu Choi
*Assistant Examiner*—Hui Chin
(74) *Attorney, Agent, or Firm*—Roylance, Abrams, Berdo & Goodman, L.L.P.

(57) ABSTRACT

A composition forming a rubber roller and an imaging apparatus including the rubber roller are provided by the invention. A small amount of a nitrogen-containing compound is formed during the process of preparing the rubber roller without deterioration of image quality of images produced by an imaging apparatus. The roller rubber forming composition includes a base rubber; a vulcanizing agent; a vulcanizing accelerator; a conducting agent; and one of an acid anhydride, a zeolite, and a blend thereof.

21 Claims, 3 Drawing Sheets

ROLLER RUBBER FORMING COMPOSITION, RUBBER ROLLER INCLUDING THE SAME, AND IMAGING APPARATUS INCLUDING THE RUBBER ROLLER

CROSS-REFERENCE TO RELATED PATENT APPLICATIONS

This application claims the benefit of Korean Patent Application No. 10-2007-0007650, filed on Jan. 24, 2007, in the Korean Intellectual Property Office, the disclosure of which is hereby incorporated by reference in its entirety.

BACKGROUND OF THE INVENTION

1. Field of the Invention

The present invention relates to a composition for forming a roller rubber, a rubber roller made from the composition, and an imaging apparatus including the rubber roller. More specifically, the invention is directed to a composition for forming roller rubber having a decreased amount of a nitrogen-containing compound without a decrease in quality of images produced by an imaging apparatus. The invention is also directed to an imaging apparatus including the rubber roller.

2. Description of the Related Art

FIG. 1 is a schematic view of a conventional electrophotographic imaging apparatus. The conventional electrophotographic imaging apparatus illustrated in FIG. 1 operates as follows. First, a photoconductive drum 11 is charged by a charging apparatus 16, and then an electrostatic latent image is formed on the photoconductive drum 11 by image exposure through a laser scanning unit (LSU) 18. A toner 14 is provided to a development roller 12 by a toner supply roller 13. The toner 14 provided to the development roller 12 is formed in a thin film having a uniform thickness by a toner layer controlling device 15 and is charged. After passing the toner layer controlling device 15, the toner 14 is used to develop the electrostatic latent image formed on the photoconductive drum 11, and the developed image is transferred onto a sheet of paper by a transfer roller 18 and fixed by a fixing device (not shown.) In addition, toner 14 remaining on the photoconductive drum 11 after the transferring process is removed by a cleaning blade 17.

In the conventional electrophotographic imaging apparatus illustrated in FIG. 1, the development roller 12 and the charging apparatus 16 comprise a rubber roller. FIG. 2 illustrates sectional and perspective views of the conventional rubber roller used in the conventional electrophotographic imaging apparatus of FIG. 1.

Referring to FIG. 2, the conventional rubber roller includes a shaft 32 and a rubber layer 31. Conventional rubber rollers can be categorized into ion conductive type rubber rollers and electron conductive type rubber rollers. Ion conductive type rubber rollers are formed of a rubber with low volume resistance, such as hydrin rubber. However, due to the high resistance of the rubber itself, it is difficult to manufacture low resistant rollers using the rubber alone, and thus a conductive additive, such as a conductive polymer material or ion conducting agent, is added to produce a conductive rubber. Electron conductive type rubber rollers can be manufactured by adding carbon black or metal powder, such as copper, to rubber rollers to provide conductivity thereto.

In ion conductive type rubber rollers, the conductive rubber used is expensive and the resistance varies according to surrounding conditions due to obtaining conductivity by ion dissociation. On the other hand, electron conductive type rubber rollers do not use such expensive conductive rubber and have a constant resistance independent of factors such as temperature and humidity in the surrounding environment.

Meanwhile, when rubber rollers formed of NBR, ECO, SBR or EPDM, are produced by sulfur crosslinking, a large amount of volatile organic compounds (VOCs) are formed from side products produced by the decomposition of vulcanizing agents, accelerators, and other additives. Therefore, the formed VOCs may damage an organic photoconductive drum (OPC) contacting a development roller of a electrophotographic imaging apparatus, thereby causing image defects.

Meanwhile, in the crosslinking process of such rubber rollers, a vulcanizing agent, such as sulfur, and a vulcanizing accelerator, such as a thiozole-based compound, a thiuram-based compound, or a sulfonamide-based compound are used. At this time, amine or amide-based nitrogen-containing compounds are formed by the decomposition of the vulcanizing accelerator under vulcanizing conditions including high temperature and high pressure. Nitrogen-containing compounds have an unpleasant odor and cause cracks in OPC coating layers formed of polycarbonate resin. In addition, the amount of total volatile organic compounds (TVOC) is increased which can be harmful.

Accordingly, there is a need to develop a rubber roller which can be produced without formation of VOCs.

SUMMARY OF THE INVENTION

The present invention provides a roller rubber forming composition for preparing a rubber roller, which minimizes the content of VOCs formed when the rubber roller is produced by sulfur crosslinking.

The present invention also provides a roller rubber made from roller rubber forming composition.

The present invention also provides a development roller including the rubber roller.

The present invention also provides a charging roller including the rubber roller.

The present invention also provides an imaging apparatus including the rubber roller.

According to an aspect of the present invention, a composition is provided for forming a roller rubber including: a base rubber; a vulcanizing agent; a vulcanizing accelerator; a conducting agent; and a component selected from the group consisting of acid anhydride, zeolite, and a blend thereof.

The amount of the vulcanizing agent is in the range of about 0.1-10 parts by weight, the amount of the vulcanization accelerator is in the range of about 0.1-10 parts by weight, the amount of the conducting agent is in the range of about 1-50 parts by weight, and the amount of one of the acid anhydride, zeolite and a blend thereof is in the range of about 1-30 parts by weight, based on 100 parts by weight of the base rubber.

The amount of the acid anhydride is in the range of about 2-10 parts by weight based on 100 parts by weight of the base rubber.

The amount of zeolite is in the range of about 5-30 parts by weight based on 100 parts by weight of the base rubber.

The average particle diameter of zeolite is in the range of about 1-50 μm.

The roller rubber forming composition may further include an antiaging agent in an amount of about 0.1-5 parts by weight based on 100 parts by weight of the base rubber.

The roller rubber forming composition may further include a filler in an amount of about 5-120 parts by weight based on 100 parts by weight of the base rubber.

The acid anhydride includes at least one anhydride selected from the group consisting of acetic anhydride, phthalic anhydride, maleic anhydride, and succinic anhydride.

The base rubber includes at least one a polymer resin selected from the group consisting of acrylonitrile rubber, epichlorohydrin rubber, acrylonitrile butadiene rubber, acrylonitrile butadiene isoprene rubber, silicon rubber, ethylene propylene rubber, ethylene propylenediene rubber, styrene butadiene rubber, and a blend thereof.

The vulcanizing agent includes at least one material selected from the group consisting of organic peroxide, sulfur, polyamines, thioureas, and mercaptan triazines.

The vulcanizing accelerator includes at least one material selected from the group consisting of zinc oxide, guanidine-based accelerator, thiazole-based accelerator, sulfenamid-based accelerator, thiuram-based accelerator, and aldehyde amine-based accelerator.

The conducting agent is an electron conducting agent, an ion conducting agent, or a blend thereof.

According to another aspect of the present invention, a rubber roller is provided including the rubber roller forming composition.

According to another aspect of the present invention, a development roller is provided including the rubber roller and a shaft.

According to another aspect of the present invention, a charging roller is provided including the rubber roller and a shaft.

According to another aspect of the present invention, an imaging apparatus is provided including the development roller or the charging roller.

These and other aspects of the invention will become apparent from the following detailed description of the invention, which in conjunction with the annexed drawings, disclose various embodiments of the invention.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
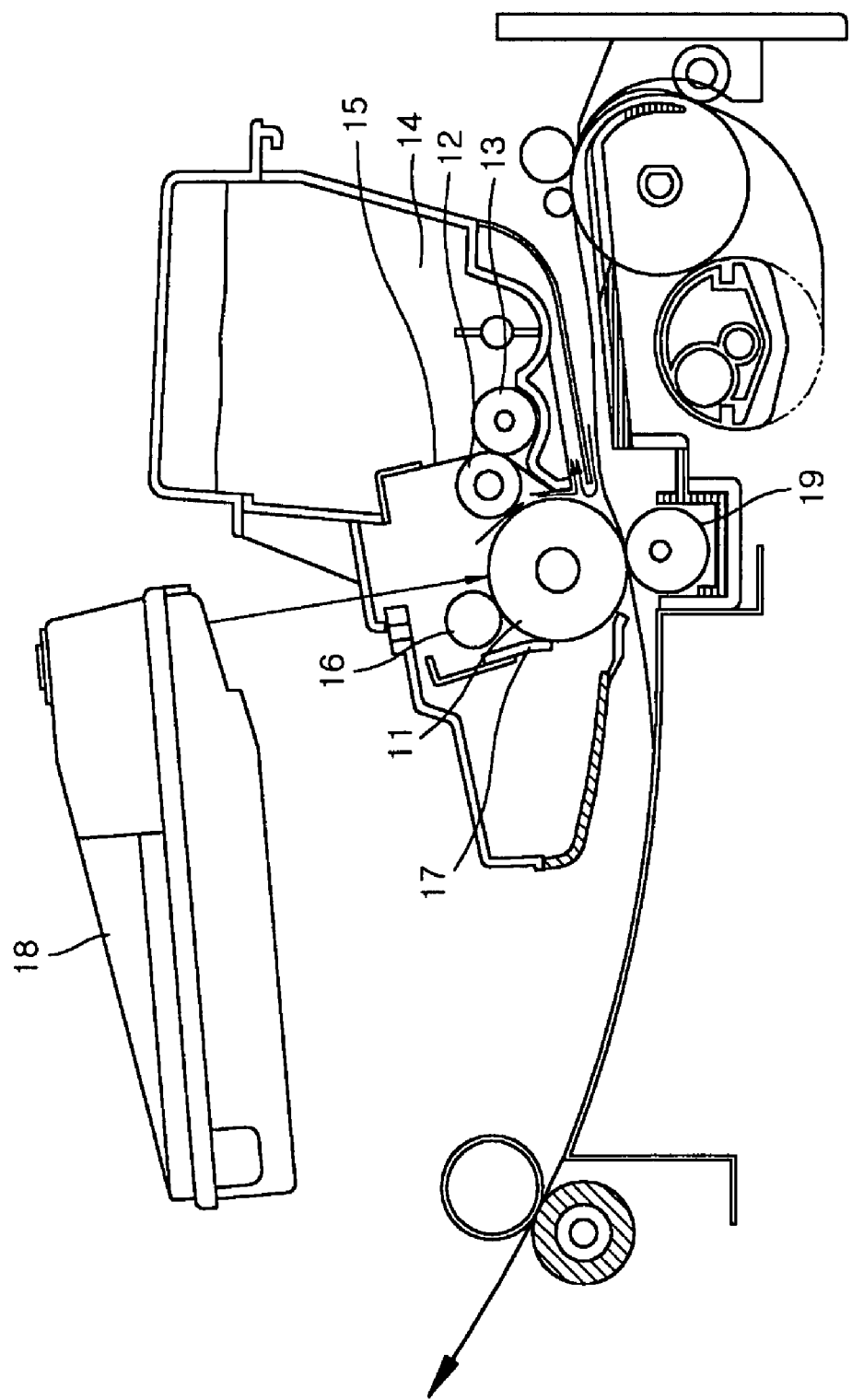
FIG. 1 is a schematic view of a conventional electrophotographic imaging apparatus.

The present invention will now be described more fully with reference to the accompanying drawings, in which exemplary embodiments of the invention are shown.

A sulfur crosslinking system for forming a rubber roller of an electrostatic printing apparatus according to the present invention is prepared using a composition for forming rubber roller which includes at least one component of an acid anhydride and a zeolite, in an amount effective to minimize the amount of volatile organic compounds (VOCs) formed by decomposition of a vulcanizing agent, an accelerator, or other additives.

A rubber roller forming composition according to the present invention includes: a base rubber; a vulcanizing agent; a vulcanizing accelerator; a conducting agent; and an acid anhydride, zeolite, or a blend thereof.

The acid anhydride included in the rubber roller forming composition according to the present invention removes one or more nitrogen-containing compounds in the form of VOCs that are formed from the rubber roller.

The nitrogen-containing compound formed from the rubber roller is formed by decomposition of a vulcanizing accelerator or the like under vulcanizing conditions, such as high temperature and high pressure, as described above. The nitrogen-containing compound can be an amine or amide-based nitrogen-containing compound, that is, a nitrogen-containing compound having at least one substitutable active hydrogen bonded to the nitrogen that can be substituted by another reactive group. Such a nitrogen-containing compound can be an alkyl amine, such as ethyl amine or propyl amine; arylamine; ethylene diamine; tetramethylthiourea; benzothiazole; or the like. The nitrogen-containing compound has an unpleasant odor and causes cracks in a coating layer of an organic photoconductive drum which is an important element of an electrophotographic imaging apparatus.

The acid anhydride included in the rubber roller forming composition can decrease the unpleasant odor by decreasing the amount of the nitrogen-containing compound using, for example, an addition reaction with the nitrogen-containing compound and an amine, and can prevent damage of an organic photoconductive drum of an electrophotographic imaging apparatus.

The acid anhydride may include at least one anhydride selected from the group consisting of acetic anhydride, phthalic anhydride, maleic anhydride, and succinic anhydride, and mixtures thereof. However, the acid anhydride is not limited thereto. That is, the acid anhydride can be any product obtained by condensation of a carboxylic acid. In addition, the acid anhydride may have a liquid phase or a solid phase. The amount of the acid anhydride in the roller rubber forming composition may be in the range of about 1-30 parts by weight, preferably about 2-10 parts by weight, based on 100 parts by weight of the base rubber. When the amount of the acid anhydride is less than 1 part by weight based on 100 parts by weight of the base rubber, an insufficient amount of the VOCs including the nitrogen-containing compound are removed. On the other hand, when the amount of the acid anhydride is greater than 30 parts by weight based on 100 parts by weight of the base rubber, excess acid anhydride leads to low transition resistance and defective images may be formed during high temperature and high humidity packaging tests.

Like the acid anhydride, the zeolite included in the rubber roller forming composition according to the present invention also removes VOCs so that the unpleasant odor due to the VOCs and prevents damage of the organic photoconductive drum.

The zeolite, which is a porous inorganic material, is a white powder and has an excellent deodorization capability. The zeolite used according to the present invention may have an average particle diameter of about 1-50 μm. When the average particle diameter of the zeolite is outside this range, an insufficient amount of the VOCs may be removed and manufacturing costs are increased due to the high price of zeolite.

The amount of zeolite may be in the range of about 1-30 parts by weight, preferably 5-30 parts by weight, based on 100 parts by weight of the base rubber. When the amount of zeolite is less than 1 part by weight based on 100 parts by weight of the base rubber, an insufficient amount of the VOCs may be removed. On the other hand, when the amount of the zeolite is greater than 30 parts by weight based on 100 parts by weight of the base rubber, the mechanical properties of the rubber roller made from the rubber roller forming composition may deteriorate.

The base rubber included in the rubber roller forming composition according to the present invention can be any rubber which can be subjected to a sulfur crosslinking system, or a blend of such types of rubbers. For example, the base rubber may include at least one of a polymer resin selected from the group consisting of acrylonitrile rubber, epichlorohydrin rubber, acrylonitrile butadiene rubber, acrylonitrile butadiene isoprene rubber, silicon rubber, ethylene propylene rubber, ethylene propylenediene rubber, styrene butadiene rubber, and blends thereof.

The acrylonitrile butadiene rubber is a copolymer prepared by low temperature emulsion polymerization of acrylonitrile and butadiene, and has excellent emulsion resistance and pharmaceutical resistance properties. When the amount of the acrylonitrile butadiene rubber increases, the rubber roller forming composition has stronger resin properties, and thus excellent friction resistance, tensile strength, and electrical resistance properties can be obtained, but bounce elasticity, permanent compression shrinking rate, cold resistance, elongation, and the like may deteriorate. The amount of the acrylonitrile butadiene rubber may be in the range of 10-35 mol % or less, but is not limited thereto. When the amount of the acrylonitrile butadiene rubber is greater than 35 mol %, dependency on environments may increase. On the other hand, when the amount of the acrylonitrile butadiene rubber is less than 10 mol %, resistance of acrylonitrile butadiene rubber may increase.

The epichlorohydrin rubber can be a terpolymer of ethyleneoxide, aryl glycidyl ether and epichlorohydrin; or a copolymer of ethyleneoxide and epichlorohydrin. The copolymerization rate of the ethyleneoxide in the epichlorohydrin rubber may be in the range of about 38-58 mol %, because when the copolymerization rate of the ethyleneoxide in the epichlorohydrin rubber is less than 38 mol %, it is difficult to obtain a resistance intensity required for a conductive roller, such as a charging roller or a development roller. The epichlorohydrin rubber can be used alone or together with other base rubbers. When the epichlorohydrin rubber is blended with other base rubbers, the amount of the epichlorohydrin rubber may be in the range of about 5-30 parts by weight based on 100 parts by weight of other base rubbers so that sufficient hardness, and dispersing and extruding properties of the conducting agent can be obtained at low costs.

The conducting agent included in the rubber roller forming composition according to the present invention, increases conductivity of a rubber roller including the rubber roller forming composition and thus decreases its resistance. The conducting agent may be an electron conducting agent or an ion conducting agent.

The electron conducting agent can be a conductive carbon black, particles of which have a small average diameter and a large surface area. For example, the average diameter of particles of the carbon black may be in the range of about 5-300 μm. Specifically, the carbon black may have a dibutyl phthalate absorption dose of 50 ml/100 g or less. Such a carbon black may be acetylene black or conductive furnace black, such as ketzen black EC, ketzen black 300J, ketzen black 600J, valcan XC, valcan CSX, or dencablack.

The ion conducting agent is not limited, and can be a quaternary ammonium salt, such as trimethyloctadecyl ammonium perchlorate or benzyl trimethyl ammonium chloride.

The amount of the conducting agent, such as the electron conducting agent or the ion conducting agent, may be about 1-50 parts by weight, preferably about 1-20 parts by weight, based on 100 parts by weight of the base rubber. When the amount of the conducting agent is less than 1 part by weight based on 100 parts by weight of the base rubber, sufficient resistance intensity of a rubber roller cannot be obtained. On the other hand, when the amount of the conducting agent is greater than 50 parts by weight based on 100 parts by weight of the base rubber, hardness of a rubber roller may increase.

The vulcanizing agent included in the rubber roller forming composition according to the present invention crosslinks the base rubber. The vulcanizing agent used according to the present invention may include at least one material selected from the group consisting of organic peroxide, sulfur, polyamines, thioureas, and mercaptan triazines.

The vulcanizing agent is not limited, and can be an organic peroxide, such as dicumyl peroxide, t-butyl peroxyhexane, benzoyl peroxide, or t-butyl peroxybenzoate; sulfur, such as thiuram polysulfites; polyamines, such as ethylene diamine, diethylene triamine, triethylene tetraamine, hexamethylene tetraamine, or ethylene diamine carbamate; thioureas, such as 2-mecapto imidazolin, 1,3-diethyl thiourea, 1,3-butyl thiourea, or trimethyl thiourea; and mercaptan triazines, such as 2,4,6-trimercapto-1,3,5-triazine or 1-methoxy-3,5-dimercaptoliazine.

The amount of the vulcanizing agent may be in the range of about 0.1-10 parts by weight, preferably about 0.5-5 parts by weight, based on 100 parts by weight of the base rubber in consideration of the vulcanizing temperature and time.

The vulcanizing accelerator included in the rubber roller forming composition according to the present invention accelerates the vulcanizing reaction. The vulcanizing accelerator can be zinc oxide, guanidine-based accelerator, thiazole-based accelerator, sulfenamide-based accelerator, thiuram-based accelerator, aldehyde amine-based accelerator, or the like. The guanidine-based accelerator can be diphenyl guanidine or ditollyl guanidine. The thiazole-based accelerator can be 2-mercapto benzo thiazol or dibenzothiadyldisulfide. The sulfenamid-based accelerator can be 2-benzothiazylsulfenamido of primary or secondary amine, such as N-ethyl-2-benzothiazylsulfenamido or N-t-butyl-2-benzothiazylsulfenimido. The thiuram-based accelerator can be tetra methyl thiuram disulfide, tetra methyl thiuram disulfide, or tetra ethyl thiuram disulfide. The aldehyde amine-based accelerator can be aniline or butyl amine.

The amount of the vulcanizing accelerator may be in the range of about 0.1-10 parts by weight based on 100 parts by weight of the base rubber in consideration of vulcanizing time.

The rubber roller forming composition according to the present invention may further include a filler formed of carbonate salt, such as calcium carbonate or magnesium carbonate, or clay. For example, the filler may be formed of calcium carbonate. The calcium carbonate can be an active calcium carbonate which is obtained by surface-treating the calcium carbonate with an organic material to increase a dispersing ability with rubber. The surface-treating agent used to surface-treat the calcium carbonate can be a fatty acid, a resin acid, a surfactant, or the like Particles of the calcium carbonate may have an average particle diameter of about 0.01-50 μm. When the average particle diameter of particles of the calcium carbonate is less than 0.01 μm, the workability of the rubber roller forming composition may decrease. On the other hand, when the average particle diameter of particles of the calcium carbonate is greater than 50 μm, friction resistance of the rubber roller may be decreased.

The amount of the filler may be in the range of about 5-120 parts by weight, preferably about 10-100 parts by weight, based on 100 parts by weight of the base rubber. When the amount of the filler is less than 5 parts by weight based on 100 parts by weight of the base rubber, friction resistance of the rubber roller forming composition may be decreased. On the other hand, when the amount of the filler is greater than 120 parts by weight based on 100 parts by weight of the base rubber, workability of the rubber roller forming composition may deteriorate.

The rubber roller forming composition may further include an antiaging agent. The antiaging agent may prevent aging of a rubber roller and prevent contamination of the rubber roller. The antiaging agent may be selected from an amine-based anti aging agent and a phenol-based anti aging agent. For example, the anti aging agent may be 2,2,4-trimethyl-1,2-dihydroquinoline polymer (TMDQ).

In consideration of an antiaging agent effect and a contamination prevention effect, the amount of the antiaging agent may be in the range of about 0.1-10 parts by weight based on 100 parts by weight of the base rubber.

The rubber roller forming composition may further include a plasticizer to uniformly blend the base rubber with other additives. The plasticizer may be phthalic acid-based plasticizer (DOP, DNP), adipic acid-based plasticizer (DOA, DINA), or maleic acid-based plasticizer (DOM.) For example, the plasticizer may be DOP. The amount of the plasticizer may be in the range of about 0.5-5 parts by weight based on 100 parts by weight of the base rubber. When the amount of the plasticizer is less than 0.5 parts by weight based on 100 parts by weight of the base rubber, the effect of adding the plasticizer is insignificant. On the other hand, when the amount of the plasticizer is greater than 5 parts by weight based on 100 parts by weight of the base rubber, migration resistance of the rubber roller may be decreased.

The roller rubber forming composition may further include a stearic acid to improve processibility of the rubber roller forming composition. The amount of the stearic acid may be in the range of about 0.1-5 parts by weight based on 100 parts by weight of the base rubber.

The rubber roller forming composition according to the present invention can be used to prepare a rubber roller. A method of preparing a rubber roller using the roller rubber forming composition will now be described in detail.

First, a preheated base rubber is pre-blended in an open roller which includes a mechanical blending apparatus, such as a kneader, an extruder, a Banbury mixer, or a Brabender mixer. At this time, a filler is added to obtain size stability, friction resistance, and good grinding property in a continuous extruding or transferring process. Then, an acid anhydride, zeolite or a blend thereof; a conducting agent; a filler; a plasticizer; or an antiaging agent are added, and then a vulcanizing agent, an vulcanization accelerator and an vulcanizing accelerator are added thereto and then uniformly dispersed in the blender. The resultant blender is aged in a given time at room temperature, and then compressed using a single-screw compressor at low temperature. Then, a vulcanizing reaction is performed at a temperature of 150-230° C. at 3-5 atm in a vulcanizing chamber to obtain a three-dimensional network structure. Then, the external dimension and surface profile of the product are controlled and a surface friction coefficient is decreased by irradiation of ultraviolet rays. As a result, a rubber roller, specifically a semi-conductive rubber roller can be obtained.

The rubber roller prepared as described above can be used as various kinds of rollers in an electrophotographic imaging apparatus, specifically, a development roller, or a charging roller.

Figure 2:
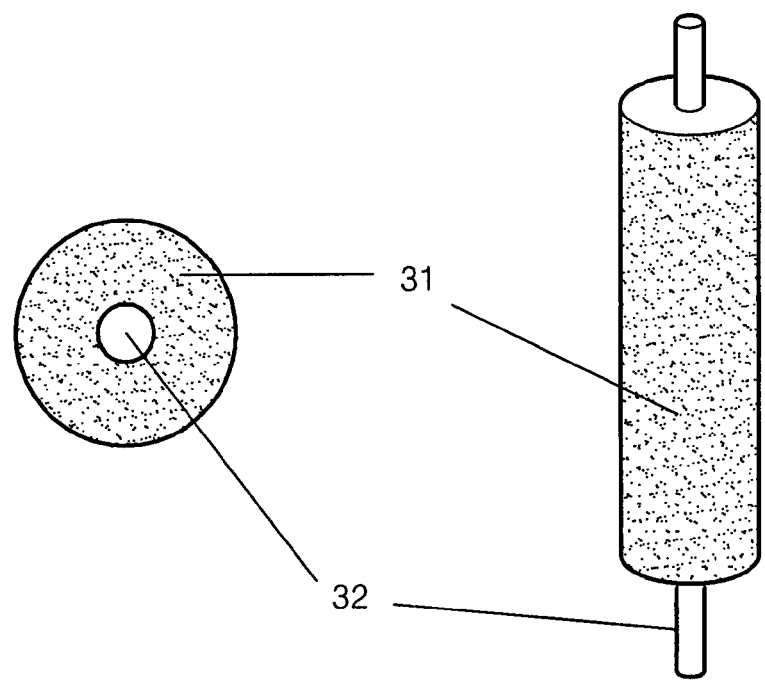
FIG. 2 illustrates sectional and perspective views of a conventional rubber roller used in the conventional electrophotographic imaging apparatus of FIG. 1.

An electrophotographic imaging apparatus including the rubber roller according to the present invention, as illustrated in FIG. 1 and FIG. 2, comprises: a photoconductive drum 11, a development roller 12, a toner supply roller 13, a toner 14, a toner layer controlling device 15, a charging apparatus 16, a cleaning blade 17, a laser scanning unit 18, and a transferring roller 19. The development roller 12 or the charging apparatus 16 may include a rubber roller 31 according to the present invention and the shaft 32. The electrophotographic imaging apparatus operates in the following charging manner. First, the photoconductive drum 11 is charged by the charging apparatus 16, and then an electrostatic latent image is formed on the photoconductive drum 11 by image exposure through laser scanning unit (LSU) 18. The toner 14 is provided to the development roller 12 by the toner supply roller 13. The toner provided to the development roller 12 is formed in a thin layer having a uniform thickness by the toner layer controlling device 15 and charged. The toner which has passed the toner layer controlling device 15 is used to develop the electrostatic latent image formed on the photoconductive drum 11, and the developed image is transferred onto a sheet of paper by the transfer roller 18 and fixed by a fixing device (not shown.) In addition, the toner which remains on the photoconductive drum 11 after the transferring process is removed by the cleaning blade 17.

An electrophotographic imaging apparatus including the rubber roller according to the present invention can be a conventional electrophotographic imaging apparatus, such as a laser printer, a fax machine, or a copier, specifically, a laser beam or LED print head-type printer, a fax machine, a copier, or a multi-functional machine.

The present invention will be described in further detail with reference to the following examples. These examples are for illustrative purposes only and are not intended to limit the scope of the present invention.

EXAMPLES 1-6

With reference to Table 1, a given amount of an acrylonitrile butadiene rubber containing 25 mol % of acrylonitrile was dissolved in a preheated Banbury mixer to obtain a melted acrylonitrile butadiene rubber, and then the melted rubber was moved to an open roller. Then, a conductive carbon black, sulfur, a vulcanization accelerator, zinc oxide, stearic acid, and an antiaging agent were added to the melted rubber and then uniformly dispersed. The resultant blend was aged at room temperature for 24 hours, and then extruded onto a tube using a single-or twin-screw extruder at 80-90° C. and vulcanized under a pressure of 5 kgf/cm$^2$ at 150° C. The obtained vulcanized rubber tube was thermally adhered to the periphery surface of a shaft (SUS) having a diameter of 6 cm and a length of 26 cm using Chemlok as an adhesive. The obtained semi-conductive rubber roller was controlled such that the peripheral dimension was 14 cm, the surface roughness was 2-3, and ultraviolet light was irradiated to the rubber roller to decrease a surface friction coefficient to 0.1-0.3. As a result, a semi-conductive rubber roller was obtained. The composition of each roller is shown in Table 1.

TABLE 1

|  | Comparative Example 1 | Example 1 | Example 2 | Example 3 | Example 4 | Example 5 | Example 6 |
|---|---|---|---|---|---|---|---|
| acrylonitrile butadiene rubber | 100 | 100 | 100 | 100 | 100 | 100 | 100 |
| conductive carbon black | 7 | 7 | 7 | 7 | 7 | 7 | 7 |
| vulcanizing agent (sulfur) | 1 | 1 | 1 | 1 | 1 | 1 | 1 |
| vulcanization accelerator 1 | 1.0 | 1.0 | 1.0 | 1.0 | 1.0 | 1.0 | 1.0 |
| vulcanizing accelerator 2 | 0.5 | 0.5 | 0.5 | 0.5 | 0.5 | 0.5 | 0.5 |
| acid anhydride (phthalic anhydride) | 0 | 1 | 7 | 15 | 0 | 0 | 0 |
| zeolite | 0 | 0 | 0 | 0 | 2 | 10 | 40 |
| Zinc oxide | 2 | 2 | 2 | 2 | 2 | 2 | 2 |
| Stearic acid | 1 | 1 | 1 | 1 | 1 | 1 | 1 |
| antiaging agent | 0.5 | 0.5 | 0.5 | 0.5 | 0.5 | 0.5 | 0.5 |
| Calcium carbonate | 10 | 10 | 10 | 10 | 10 | 10 | 10 | conductive carbon black: conductive furnace black
vulcanization accelerator 1: mercaptobenzothiazol
vulcanizing accelerator 2: cyclohexylbenzothiazol-2-sulfenamide
antiaging agent: 2,2,4-trimethyl-1,2-dihydroquinoline polymer (TMDQ)

COMPARATIVE EXAMPLE 1

A rubber roller was prepared in the same manner as in Example 1, except that the acid anhydride was not used.
<Property Tests>
NN resistance, hardness (shore A), roughness (Ra), friction coefficient, and high temperature and high humidity packaging tests were performed using the rubber rollers obtained according to Comparative Example 1 and Examples 1-6. The results are shown in Table 2.

The roller rubber to which zeolite was added according to each of Examples 4-6 showed similar properties to the roller rubber prepared according to Comparative Example 1, in terms of resistance, hardness, roughness, and the like. However, when the amount of zeolite was 20 parts by weight or more, hardness and roughness were slightly increased.
<Component Analysis Tests>
Components of the rubber rollers prepared according to Comparative Example 1 and Examples 2 and 5 were measured using a GC Mass analyzer. As a result, a significant

TABLE 2

|  | Comparative Example 1 | Example 1 | Example 2 | Example 3 | Example 4 | Example 5 | Example 6 |
|---|---|---|---|---|---|---|---|
| NN resistance | 4.0E+05 | 4.0E+05 | 6.0E+05 | 9.0E+05 | 3.0E+05 | 8.0E+05 | 3.0E+06 |
| Hardness (shore A) | 50 | 50 | 51 | 53 | 51 | 52 | 56 |
| Roughness (Ra) | 2.5 | 2.3 | 2.2 | 2.3 | 2.4 | 2.2 | 2.1 |
| Friction coefficient | 0.24 | 0.22 | 0.23 | 0.21 | 0.21 | 0.21 | 0.21 |
| High temperature and high humidity packaging test | O.K | O.K | O.K | Moderate | O.K | O.K | O.K |

Referring to Table 2, resistance was measured using a current meter, a voltage meter, and zig. The specific rubber roller to be tested was loaded to the zig and a charge of 1000KG and a voltage of −500V were applied to measure a current. The hardness test was performed using a shore A, and the roughness test was performed using a mach apparatus to obtain a central line average roughness (Ra) in the direction of a column. The friction coefficient was measured in such a way that 70 g of a weight was daggled to an OHP film, loaded on the roller, and then pulled at a speed of 70 mm/min. The high temperature and high humidity packaging test was performed in such a way that the roller rubber was left to sit for 5 days in a chamber in which the temperature was 50° C. and humidity was 80%, and then before-and after-images of the rubber roller were compared.

The roller rubber to which an acid anhydride was added according to each of Examples 1-3 showed similar properties to the roller rubber prepared according to Comparative Example 1, in terms of resistance, hardness, roughness, and the like.

amount of a nitrogen-containing compound, such as dimethylamine, cyclohexylcarbodiamide, tetramethylthiourea, or benzothiazole was identified.

Figure 3:
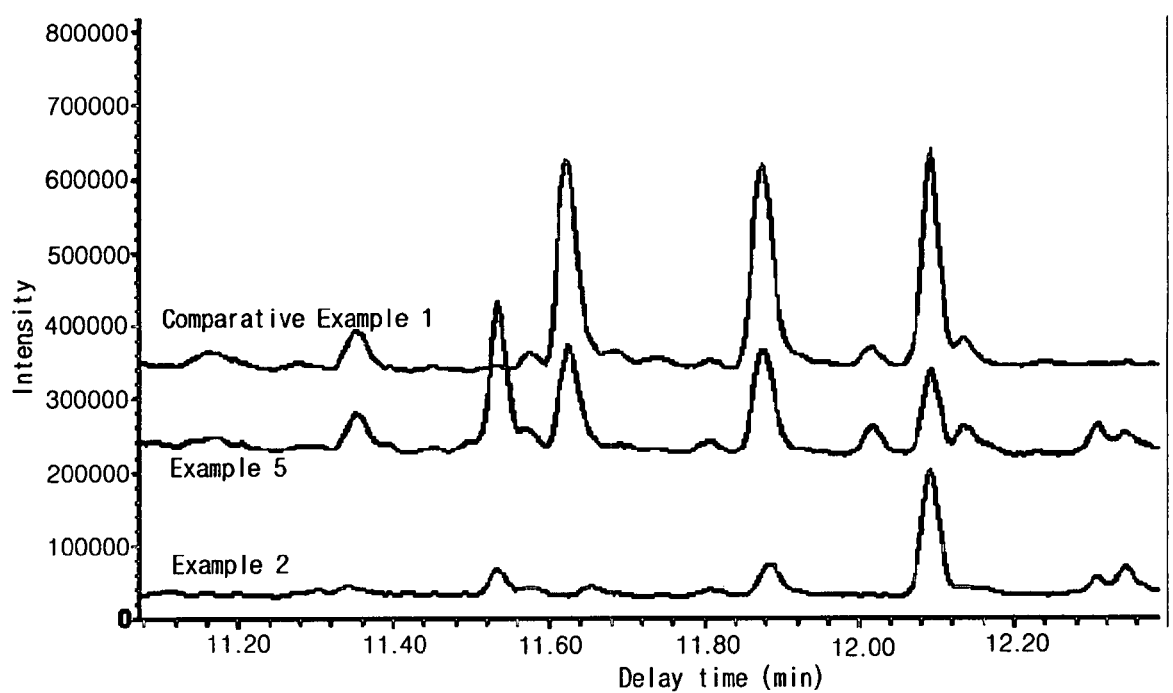
FIG. 3 illustrates mass spectra analysis of the rubber rollers obtained according to Example 2, Example 5, and Comparative Example 1.
Figure 4:
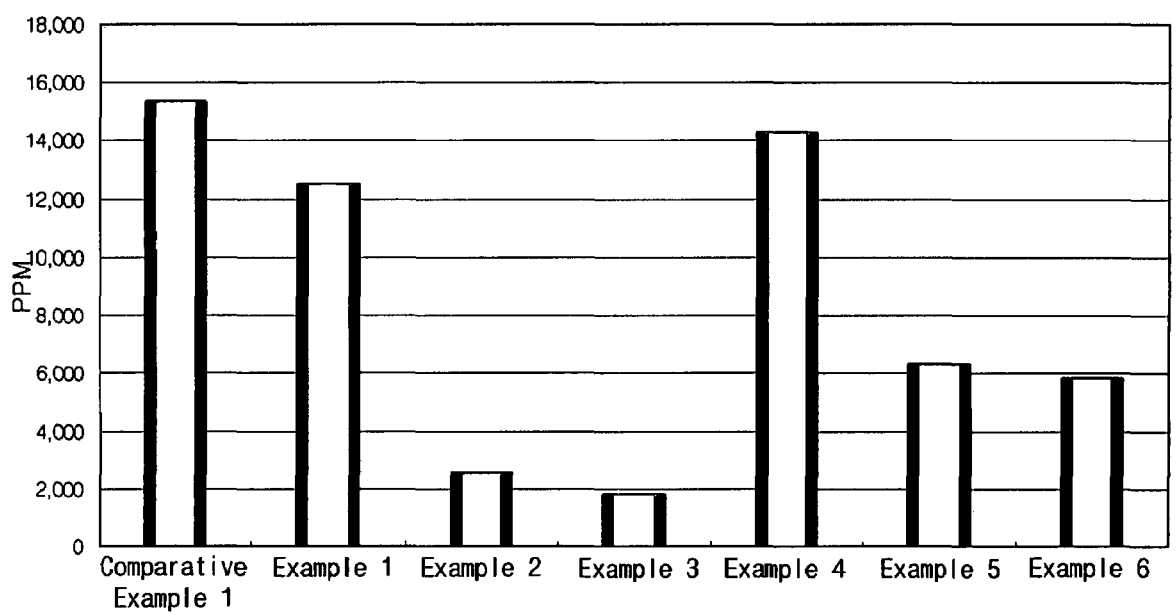
FIG. 4 is a bar chart showing the amount of a nitrogen-containing compound in each of the rubber rollers obtained according to Examples 1-6 and Comparative Example 1.

The test results are shown in FIG. 3. FIG. 3 illustrates mass analysis spectra of the rubber rollers obtained according to Example 2, Example 5, and Comparative Example 1. When 7 parts by weight of the acid anhydride was added according to Example 2, the amount of the volatile organic compound (VOC) identified was decreased compared to the roller rubber prepared according to Comparative Example 1. In addition, when zeolite was added according to Example 5, the amount of the volatile organic compound (VOC) was significantly decreased compared to the rubber roller prepared according to Comparative Example 1.
<Volatile Organic Compound Content Measurement>
A gas chromatography mass (GC-Mass) system was used to measure the amount of volatile organic compounds (VOCs) in the rubber rollers obtained according to Examples 1-6 and Comparative Example 1. The results are shown in FIG. 4. FIG. 4 is a bar chart showing the amount of a nitrogen-containing compound in each of the rubber rollers obtained according to Examples 1-6 and Comparative Example 1. According to the GC Mass spectra system, the VOC generated from each of the rubber rollers was sampled using an adhesive, and then the sampled VOC was loaded to a thermal stripper and heated at high temperature. The heated sample was loaded to a GC-MSD to perform quantitative and qualitative analyses thereon.

Referring to FIG. 4, the amount of the nitrogen-containing compound was significantly decreased when an acid anhydride or a zeolite was added according to Examples 1-6 compared to in the roller rubber prepared according to Comparative Example 1.

<Image Test>

Image concentration according to the sheets of printed paper (black concentration), 2-by-2 (black band, white band, concentration. steps, etc), compression set (C/S,) and dot reproduction were tested using the rubber rollers according to Examples 1, 3 and 6 and Comparative Example 1. The results are shown in Table 3.

TABLE 3

|  | 1/D | 2 by 2 | C/S | Dot reproduction |
|---|---|---|---|---|
| Example 1 | ○ | Δ | ○ | ○ |
| Example 3 | ○ | Δ | ○ | ○ |
| Example 6 | ○ | Δ | ○ | ○ |

1/D: concentration of black measured in a concentration system
2 by 2: black band, white band, concentration step, etc.
C/S: Compression set
Dot reproduction: 1 dot line reproduction
Test standards
○: excellent
Δ: moderate
X: poor Referring to Table 3, the 2-by-2 image is an image that is used to measure a black band or white band using a 1200 dpi image, and C/S is a method of measuring a restoring force of a rubber when the rubber is left to sit for 8 or more hours in a high temperature and high humidity condition (HH condition) or a low temperature and low humidity (LL condition.) When the restoring force of the rubber is low, the formed image has black lines in a vertical direction.

According to the image test results, the image obtained using the roller rubber to which acid anhydride or zeolite was added showed the same quality when compared to the image obtained using the roller rubber prepared according to Comparative Example 1.

A rubber roller forming composition according to the present invention includes at least one of an acid anhydride and zeolite, so that the amount of the nitrogen-containing compound which causes cracks in an organic photoconductive drum coating layer (polycarbonate) for coating an organic photoconductive drum and has an unpleasant odor can be minimized without deterioration of image quality of images produced in an imaging apparatus including the organic photoconductive drum. A rubber roller including the rubber roller forming composition can be used as a development roller, a charging roller, or the like, and such rollers can be used in an imaging apparatus.

While the present invention has been specifically shown and described with reference to exemplary embodiments thereof, it will be understood by those of ordinary skill in the art that various changes in form and details may be made therein without departing from the spirit and scope of the present invention as defined by the following claims.

What is claimed is:

1. A composition for forming a roller rubber comprising:
   a base rubber;
   a vulcanizing agent;
   a vulcanizing accelerator;
   a conducting agent; and
   at least one VOC reducing component selected from the group consisting of an acid anhydride, a zeolite, and a blend thereof, said acid anhydride, zeolite or blend thereof being present in an amount effective to inhibit the release of VOCs from the composition.

2. The roller rubber forming composition of claim 1, wherein the amount of the vulcanizing agent is in the range of about 0.1-10 parts by weight, the amount of the vulcanization accelerator is in the range of about 0.1-10 parts by weight, the amount of the conducting agent is in the range of about 1-50 parts by weight, and the amount of one of the acid anhydride, zeolite or blend thereof is in the range of about 1-30 parts by weight, based on 100 parts by weight of the base rubber, 3. The roller rubber forming composition of claim 1, wherein the amount of the acid anhydride is in the range of about 2-10 parts by weight based on 100 parts by weight of the base rubber.

4. The roller rubber forming composition of claim 1, wherein the amount of the zeolite is in the range of about 5-30 parts by weight based on 100 parts by weight of the base rubber.

5. The roller rubber forming composition of claim 1, wherein the average particle diameter of particles of the zeolite is in the range of about 1-50 μm.

6. The roller rubber forming composition of claim 1, further comprising an antiaging agent in an amount of about 0.1-5 parts by weight based on 100 parts by weight of the base rubber.

7. The roller rubber forming composition of claim 1, further comprising a filler in an amount of about 5-120 parts by weight based on 100 parts by weight of the base rubber.

8. The roller rubber forming composition of claim 1, wherein the acid anhydride comprises at least one anhydride selected from the group consisting of acetic anhydride, phthalic anhydride, maleic anhydride, and succinic anhydride.

9. The roller rubber forming composition of claim 1, wherein the base rubber comprises at least one polymer resin selected from the group consisting of acrylonitrile rubber, epichlorohydrin rubber, acrylonitrile butadiene rubber, acrylonitrile butadiene isoprene rubber, silicon rubber, ethylene propylene rubber, ethylene propylenediene rubber, styrene butadiene rubber, and blends thereof.

10. The roller rubber forming composition of claim 1, wherein the vulcanizing agent comprises at least one material selected from the group consisting of organic peroxide, sulfur, polyamines, thioureas, and mercaptan triazines.

11. The roller rubber forming composition of claim 1, wherein the vulcanizing accelerator comprises at least one material selected from the group consisting of zinc oxide, guanidine-based accelerator, thiazole-based accelerator, sulfenamid-based accelerator, thiuram-based accelerator, and aldehyde amine-based accelerator.

12. The roller rubber forming composition of claim 1, wherein the conducting agent is an electron conducting agent, an ion conducting agent, or a blend thereof.

13. A rubber roller comprising the rubber roller forming composition of claim 1.

14. A development roller comprising a rubber roller and a shaft wherein the rubber roller is made from the composition of claim 1.

15. A charging roller comprising a rubber roller and a shaft wherein the rubber roller is made from the composition of claim 1.

16. An imaging apparatus comprising the development roller of claim 14.

17. An imaging apparatus comprising the charging roller of claim 15.

18. The composition of claim 1, wherein the VOCs are produced by the decomposition of a vulcanizing accelerator or vulcanizing agent during a vulcanizing process step.

19. The composition of claim 18, wherein the VOC is a nitrogen containing compound.

20. The composition of claim 1, wherein the VOC reducing compound is an acid anhydride.

21. The composition claim 1, wherein the VOC reducing compound is a zeolite.

* * * * *